US012776603B2

(12) United States Patent
Takashima et al.

(10) Patent No.: US 12,776,603 B2
(45) Date of Patent: Oct. 27, 2026

(54) SPACER FOR LOCKING MULTIPLE TERMINALS IN AN ELECTRICAL CONNECTOR HOUSING

(71) Applicant: Yazaki Corporation, Tokyo (JP)

(72) Inventors: Naoto Takashima, Makinohara (JP); Hiroshi Miyazaki, Tokyo (JP)

(73) Assignee: Yazaki Corporation, Tokyo (JP)

( * ) Notice: Subject to any disclaimer, the term of this patent is extended or adjusted under 35 U.S.C. 154(b) by 355 days.

(21) Appl. No.: 18/646,908

(22) Filed: Apr. 26, 2024

(65) Prior Publication Data

US 2024/0405469 A1 Dec. 5, 2024

(30) Foreign Application Priority Data

Jun. 1, 2023 (JP) ................................ 2023-090975

(51) Int. Cl.

*H01R 13/42* (2006.01)
*H01R 13/436* (2006.01)
*H01R 13/40* (2006.01)
*H01R 13/424* (2006.01)
*H01R 13/428* (2006.01)

(52) U.S. Cl.

CPC ........... *H01R 13/42* (2013.01); *H01R 13/436* (2013.01); *H01R 13/4361* (2013.01); *H01R 13/40* (2013.01); *H01R 13/424* (2013.01); *H01R 13/428* (2013.01); *H01R 13/4362* (2013.01)

(58) Field of Classification Search

CPC .. H01R 13/42; H01R 13/436; H01R 13/4361; H01R 13/40; H01R 13/424; H01R 13/428; H01R 13/4362

See application file for complete search history.

(56) References Cited

U.S. PATENT DOCUMENTS

2009/0298353 A1 12/2009 Kojima
2020/0227871 A1 7/2020 Kobayashi
2024/0313459 A1 * 9/2024 Yoshida ............ H01R 13/4364

* cited by examiner

*Primary Examiner* — Justin M Kratt
(74) *Attorney, Agent, or Firm* — Sughrue Mion, PLLC

(57) ABSTRACT

A spacer is mounted on a housing accommodating a plurality of terminals to configure a connector and to prevent the plurality of terminals from slipping out. The spacer includes a main body portion provided with a plurality of terminal insertion holes through which the plurality of terminals pass respectively; a pair of retaining arms being retained to the housing; a connection portion configured to connect the main body portion and each of the pair of the retaining arms; and a pair of protrusion portions protruding from the connection portion. In the spacer, the main body portion is arranged at one side of the retaining arm, and the protrusion portion is arranged at the other side of the retaining arm. Also, both end portions in a longitudinal direction of the spacer are arranged at the outside with respect to the pair of retaining arms.

2 Claims, 9 Drawing Sheets

PRIOR ART

SPACER FOR LOCKING MULTIPLE TERMINALS IN AN ELECTRICAL CONNECTOR HOUSING

TECHNICAL FIELD

The present invention relates to a spacer as a constitution member of a connector.

BACKGROUND ART

A connector configured to perform a double-retaining of a terminal accommodated in a housing to prevent the terminal from slipping out by a lance provided in the housing and a spacer mounted to the housing is known (for example, see Patent Document 1).

FIG. 8 is an exploded view showing a connector 501 including a conventional spacer 504. This connector 501 includes a housing 502 in which a plurality of terminal accommodation rooms 522 are provided, a terminal 503 that is accommodated in each terminal accommodation room 522 (only one is shown), and a spacer 504 that is mounted to the housing 502 to prevent the terminal 503 from slipping out.

The terminal 503 is a configuration connected to a terminal of an electric wire 511, and including a core wire crimping portion 531, a covered crimping portion 532, and a connection portion 533 formed in a square tubular shape and connected with a terminal of a mating connector.

In each terminal accommodation room 522 of the housing 502, a lance retaining to the terminal 503 is provided therein. Also, in the housing 502, a concave portion for the spacer 504 to be inserted thereinto is provided.

The spacer 504 includes a main body portion 541 in which a plurality of terminal insertion holes 542 through which the terminals 503 are passed, and a pair of retaining arms 545 that retain to the housing 502. The pair of retaining arms 545 are provided to extend from both end portions of the main body portion 541.

In a temporary retaining state in which the spacer 504 is inserted into the concave portion of the housing 502, with regard to the connector 501, each terminal 503 is inserted into each terminal accommodation portion 522, and each lance is retained to each terminal 503. Also, at this time, each terminal 503 is passed through each terminal insertion hole 542 of the spacer 504. Thereafter, the spacer 504 is inserted into the concave portion more deeply to be regularly retained to the housing 502 such that the spacer 504 is retained to each terminal 503.

In this manner, the connector 501 performs the double-retaining of the terminal 503 by the lance of the housing 502 and the spacer 504.

CITATION LIST

Patent Documents

[Patent Document 1] JP 2020-113505A

SUMMARY OF THE INVENTION

Technical Problem

In the above-described conventional spacer 504, since the retaining arms 545 are provided at both sides of the main body portion 541 and the retaining arms 545 are exposed, as shown in FIG. 9, there is a problem that the retaining arms 545 of the plurality of spacers 504 are easy to get entangled with each other. More specifically, there are cases in which when assembling the connector 501 by a machine, the retaining arms 545 of the plurality of spacers 504 inside a part feeder get entangled with each other, or the retaining arms 545 of the plurality of spacers 504 get entangled with each other during the transportation of the members before the assembly.

In a case in which the retaining arms 545 get entangled with each other as described above, the retaining arms 545 are damaged or the machine is stopped such that the production efficiency decreases, and thus improvement is required.

An object of the present invention is to provide a spacer configured to be able to prevent the plurality of spacers from getting entangled with each other during the assembly of the connectors by the machine or during the transportation of the members.

Solution to Problem

The present invention relates to a spacer mounted on a housing accommodating a plurality of terminals to prevent the plurality of terminals from slipping out, wherein the spacer includes a main body portion provided with a plurality of terminal insertion holes through which the plurality of terminals pass respectively; a retaining arm being retained to the housing; a connection portion configured to connect the main body portion and the retaining arm; and a protrusion portion protruding from the connection portion, and characterized in that the main body portion is arranged at one side of the retaining arm, and the protrusion portion is arranged at the other side of the retaining arm.

Effect of the Invention

According to the present invention, it is possible to prevent the retaining arms of the plurality of spacers from getting entangled with each other during the assembly of the connectors by the machine or during the transportation of the members.

DESCRIPTION OF EMBODIMENTS

A "spacer" according to an embodiment of the present invention will be described by referring to FIG. 1 to FIG. 7.

Figure 1:
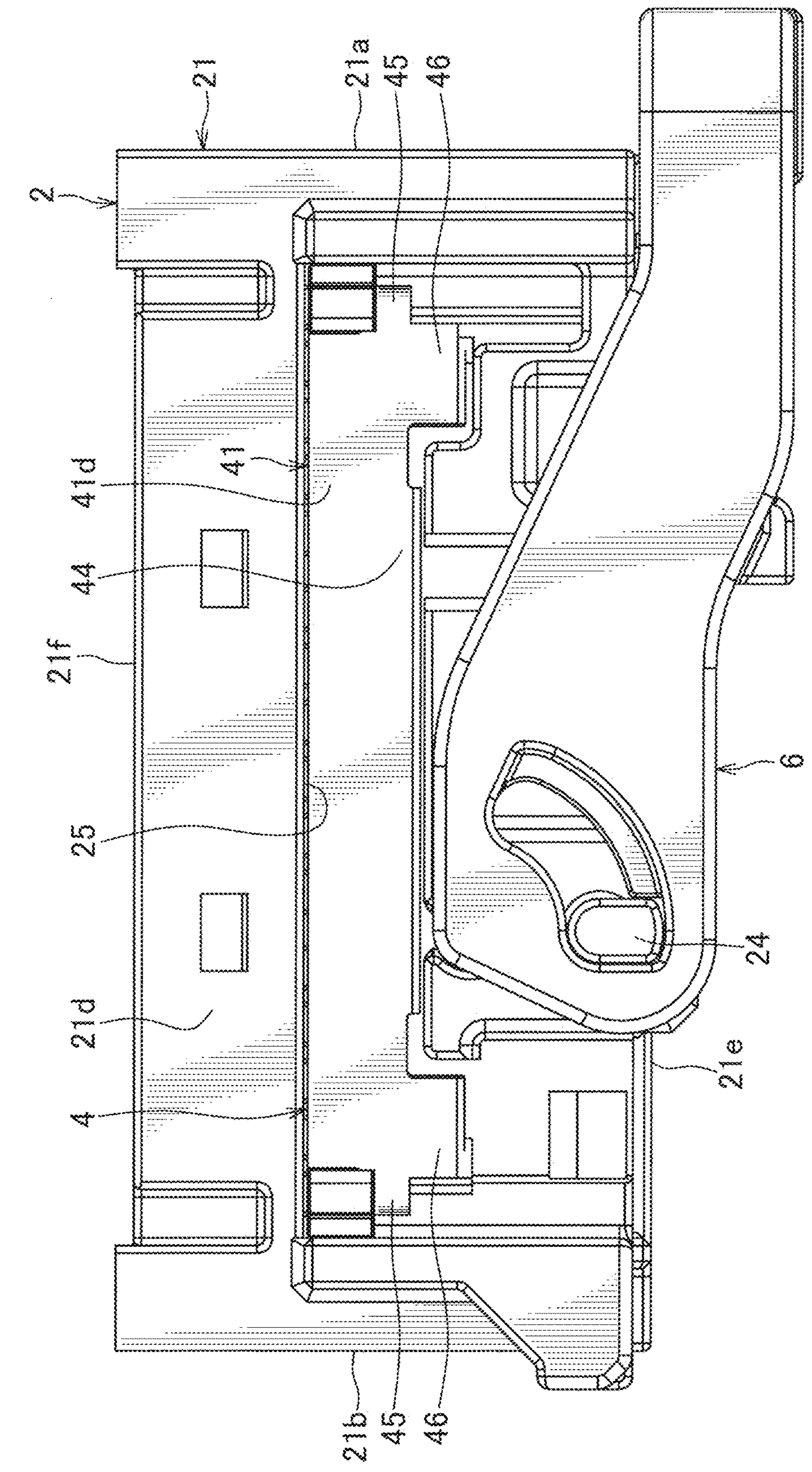
FIG. 1 is a bottom view showing a connector including a spacer according to an embodiment of the present invention.
Figure 2:
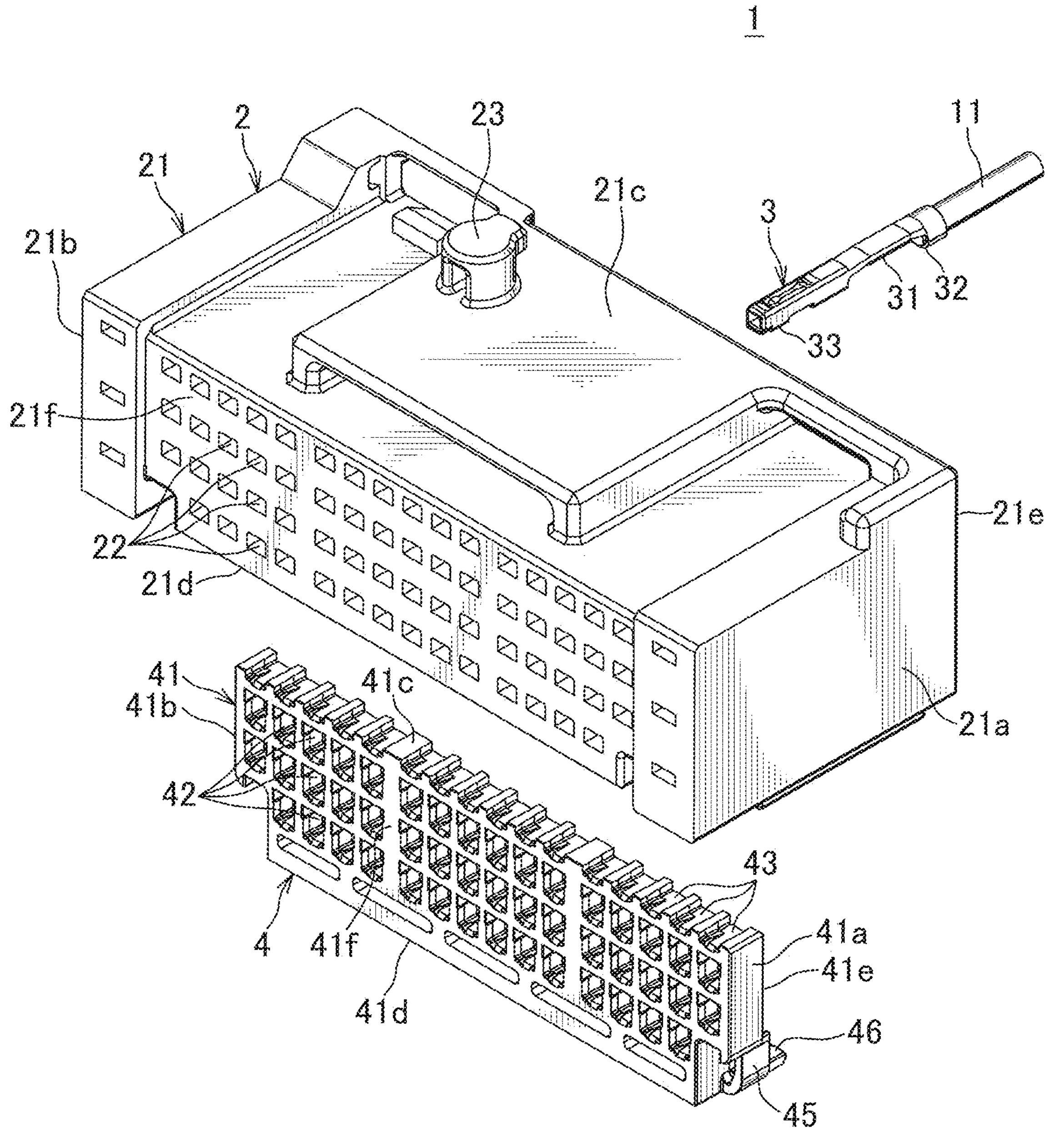
FIG. 2 is an exploded view showing the connector in FIG. 1.
Figure 3:
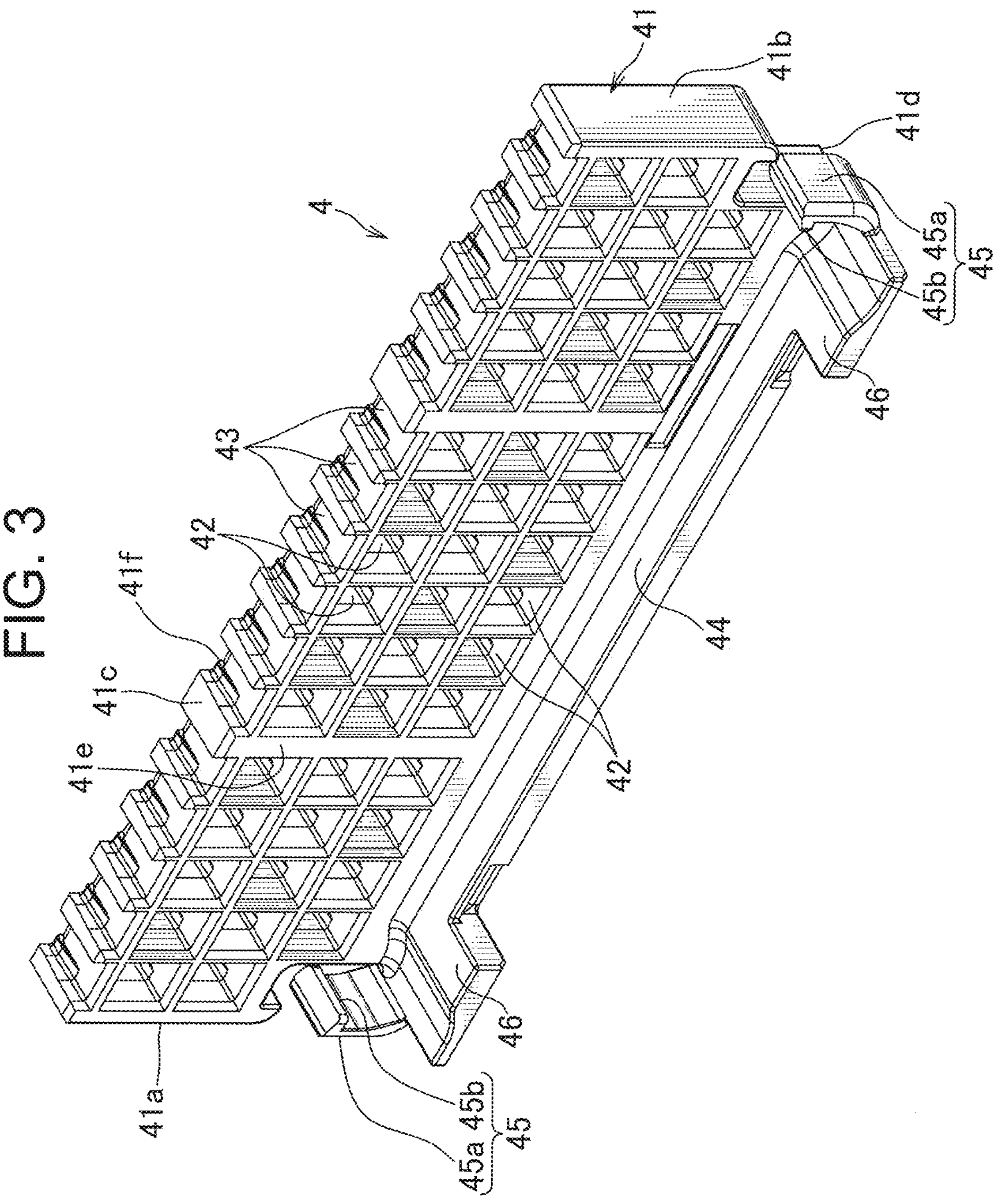
FIG. 3 is a perspective view showing the spacer in FIG. 2.
Figure 4:
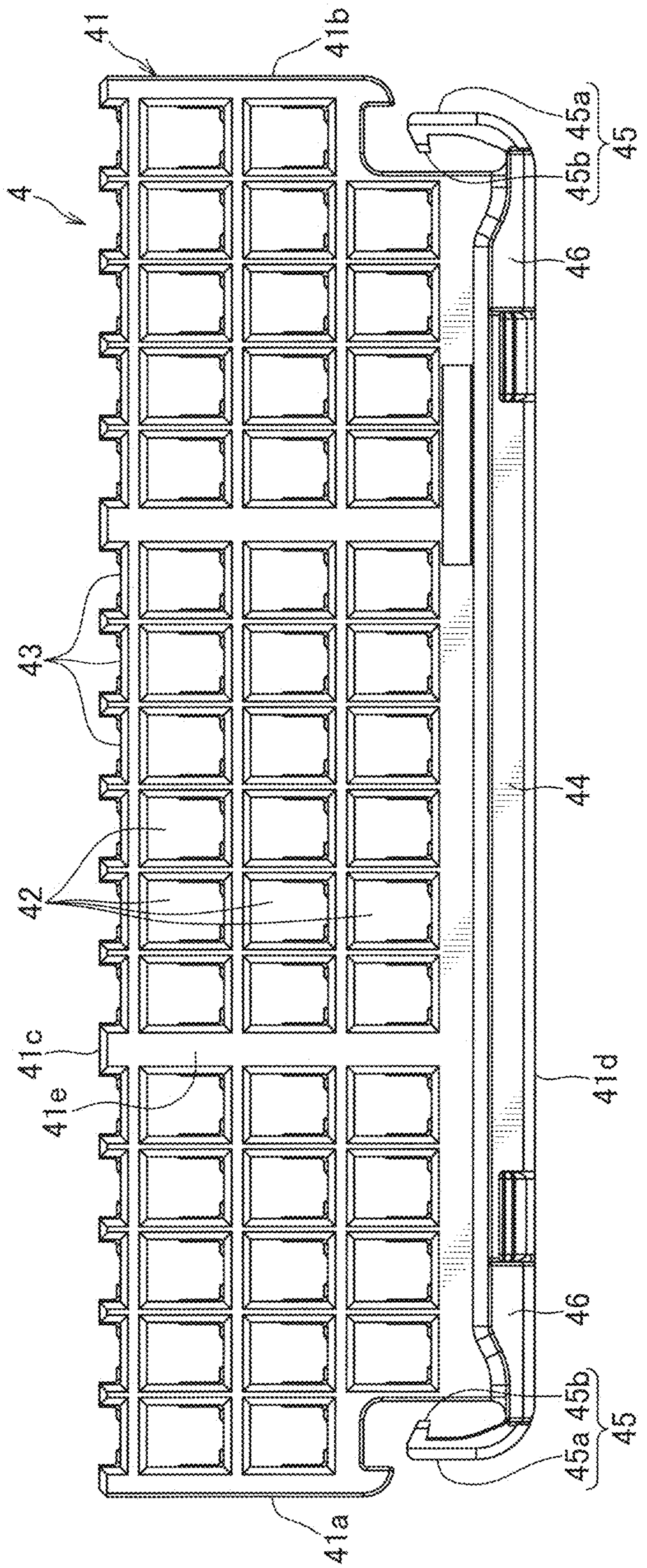
FIG. 4 is a rear view showing the spacer in FIG. 3.
Figure 5:
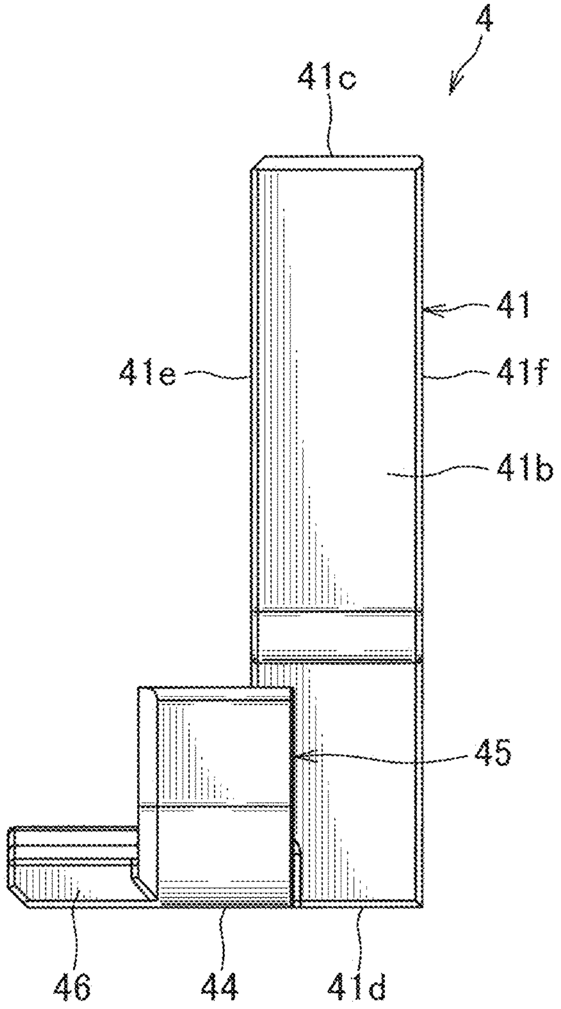
FIG. 5 is a side view showing the spacer in FIG. 3.

As shown in FIG. 1 and FIG. 2, a spacer 4 is a member that is mounted to a housing 2 accommodating a plurality of terminals 3 to configure a connector 1 and configured to prevent the terminals 3 from slipping out. That is, the connector 1 includes the housing 2, the plurality of terminals 3 (there is only one shown in FIG. 2) accommodated in the housing 2, levers 6 (there is only one shown in FIG. 1), and the spacer 4.

The terminal 3 is a member connected to a terminal of an electric wire 11, and includes a core wire crimping portion 31 crimping an exposed core wire of the electric wire 11, a covered crimping portion 32 crimping a covered portion of the electric wire 11, and a connection portion 33 formed in a square tubular shape and connected to a male terminal of a mating connector (not shown in figure). Such terminal 3 is generally referred to as a female terminal.

The housing 2 is configured by an insulation synthetic resin. The housing 2 includes a housing main body 21 in a rectangular parallelopiped shape, an attachment boss 23 to which the lever 6 is rotatably attached, and an auxiliary guide boss 24.

As shown in FIG. 2, the housing main body 21 includes a front surface 21*f*, a rear surface 21*e*, a top surface 21*c*, a bottom surface 21*d*, and a pair of side surfaces 21*a*, 21*b*. The front surface 21*f* is a surface facing the mating connector in a fitting direction. The rear surface 21*e* is a surface at the opposite side of the front surface 21*f*. The top surface 21*c* is a surface where the boss 23 is provided. The top surface 21*c* is a surface having the long sides of the front surface 21*f* and the rear surface 21*e*. The bottom surface 21*d* is a surface at the opposite side of the top surface 21*c*, and where the auxiliary guide boss 24 is provided. The bottom surface 21*d* is a surface having the long sides of the front surface 21*f* and the rear surface 21*e*. The side surfaces 21*a*, 21*b* are surfaces having the short sides of the front surface 21*f* and the rear surface 21*e*.

It is noted that the names of the top surface 21*c* and bottom surface 21*d* of the housing main body 21 are only names given for convenience based on the paper direction of FIG. 2, and it does not necessarily correspond to an up-down direction in a situation when the connector 1 is actually used.

In the housing main body 21, a plurality of terminal accommodation rooms 22, a lance being retained to each terminal 3 that is accommodated in each terminal accommodation room 22, and a concave portion 25 in which the spacer 4 is inserted are provided. Each terminal accommodation room 22 opens on the front surface 21*f* and the rear surface 21*e*. The terminal 3 is inserted into the terminal accommodation room 22 from the rear surface 21*e* side. The male terminal as the mating connector is inserted into the terminal accommodation room 22 from the front surface 21*f* side, and then inserted into the connection portion 33 formed in the square tubular shape.

As shown in FIG. 1, the concave portion 25 is formed to be recessed from the bottom surface 21*d* of the housing main body 21 toward the top surface 21*c* side.

The lever 6 is configured of the insulation synthetic resin. The lever 6 is rotatably mounted to the housing 2, and configured to rotate from an initial position to a fitting completion position so as to bring the housing 2 and the mating connector closer and fitted with each other.

The spacer 4 shown in FIG. 1 to FIG. 5 is configured of the insulation synthetic resin. The spacer 4 includes a main body portion 41 provided with a plurality of terminal insertion holes 42 through which the terminals 3 are passed respectively, a pair of retaining arms 45 that are retained to the housing 2, a connection portion 44 connecting the main body portion 41 and each retaining arm 45, and a pair of protrusion portions 46 protruding from the connection portion 44.

The main body portion 41 is formed in a plate shape having a longitudinal direction and a short direction. The longitudinal direction of the main body portion 41 is coincided with the longitudinal direction of the housing 2 in a state in which the spacer 4 is inserted into the concave portion 25. The short direction of the main body portion 41 is coincided with a depth direction (a direction from the bottom surface 21*d* of the housing main body 21 toward the top surface 21*c*) of the concave portion 25 in the state in which the spacer 4 is inserted into the concave portion 25. The plurality of terminal insertion holes 42 penetrate the main body portion 41 in a thickness direction being orthogonal to the longitudinal direction and the short direction of the main body portion 41. That is, the terminal insertion direction in which the terminals 3 pass through the terminal insertion holes 42 respectively is orthogonal to the longitudinal direction and the short direction of the main body portion 41.

The main body portion 41 includes a front surface 41*f*, a rear surface 41*e*, a top surface 41*c*, a bottom surface 41*d*, and a pair of side surfaces 41*a*, 41*b*. The front surface 41*f* is a surface disposed at the front surface 21*f* side of the housing main body 21 in the state in which the spacer 4 is inserted into the concave portion 25. The rear surface 41*e* is a surface disposed at the rear surface 21*e* side of the housing main body 21 in the state in which the spacer 4 is inserted into the concave portion 25. The top surface 41*c* is a surface disposed at the top surface 21*c* side of the housing main body 21 in the state in which the spacer 4 is inserted into the concave portion 25. The bottom surface 41*d* is a surface disposed at the bottom surface 21*d* side of the housing main body 21 in the state in which the spacer 4 is inserted into the concave portion 25. The side surface 41*a* is a surface disposed at the side surface 21*a* side of the housing main body 21 in the state in which the spacer 4 is inserted into the concave portion 25. The side surface 41*b* is a surface disposed at the side surface 21*b* side of the housing main body 21 in the state in which the spacer 4 is inserted into the concave portion 25.

It is noted that the names of the top surface 41*c* and bottom surface 41*d* of the main body portion 41 are only names given for convenience in correspondence with the top surface 21*c* and the bottom surface 21*d* of the housing main body 21, and it does not necessarily correspond to an up-down direction in a situation when the connector 1 is actually used.

A plurality of concave portions 43 are provided in the top surface 41*c* of the main body portion 41. These concave portions 43 are disposed in the terminal accommodation rooms 22 at the uppermost segment (segment at the top surface 21*c* side) of the housing main body 21. Then, the inner surface of the concave portion 43 abuts against the terminal 3 inside the terminal accommodation room 22. The terminal insertion holes 42 are disposed inside the terminal accommodation rooms 22 other than the uppermost segment. Then, the inner surface of the terminal insertion hole 42 abuts against the terminal 3 inside the terminal accommodation room 22.

In a temporary retaining state in which the spacer 4 is inserted into the concave portion 25 of the housing 2, each terminal 3 is inserted into each terminal accommodation room 22, and each lance is retained to each terminal 3. Also, at this time, each terminal 3 is passed through each terminal insertion hole 42 of the spacer 4. Thereafter, the spacer 4 is inserted into the concave portion 25 more deeply to be regularly retained to the housing 2, the inner surface of the concave portion 43 and the inner surface of the terminal insertion hole 42 are retained to each terminal 3. In this manner, the connector 1 performs the double-retaining of the terminal 3 by the lance of the housing 2 and the spacer 4.

The connection portion 44 is continuous with an end portion at the bottom surface 41*d* side of the rear surface 41*e* of the main body portion 41 and formed in an elongated plate shape extending in the longitudinal direction of the main body portion 41. The bottom surface of the connection portion 44 is formed to be aligned with the bottom surface 41*d* of the main body portion 41.

The pair of retaining arms 45 are continuous with both end portions of the connection portion 44 in the longitudinal direction. Each retaining arm 45 includes an arm portion 45*a* extending toward the top surface 41*c* side of the main body portion 41 from the end portion of the connection portion 44, and a claw portion 45*b* protruding from a tip end separating from the connection portion 44 of the arm portion 45*a*. In this manner, the pair of retaining arms 45 are arranged to be spaced with an interval therebetween in the longitudinal direction of the main body portion 41. Also, the pair of retaining arms 45 are arranged at the central side with respect to the both end portions (the side surfaces 41*a*, 41*b*) in the longitudinal direction of the main body portion 41.

In the concave portion 25 in which the spacer 4 is inserted, a temporary retaining portion to which the pair of retaining arms 45 are temporarily retained and a regular retaining portion to which the pair of retaining arms 45 are regularly retained are provided.

A pair of protrusion portions 46 are protruding form the end surface of the connection portion 44 to the opposite side with respect to the main body portion 41. The bottom surfaces of the pair of protrusion portions 46 are formed to be aligned with the bottom surface of the connection portion 44. One side of the pair of protrusion portions 46 is arranged in the vicinity of one side of the pair of retaining arms 45. The other side of the pair of protrusion portions 46 is arranged in the vicinity of the other side of the pair of retaining arms 45.

In this manner, the main body portion 41 is arranged at the one side (the right side in FIG. 5) of the terminal insertion direction in the retaining arm 45, and the protrusion portion 46 is arranged at the other side (the left side in FIG. 5) of the terminal insertion direction in the retaining arm 45.

Figure 6:
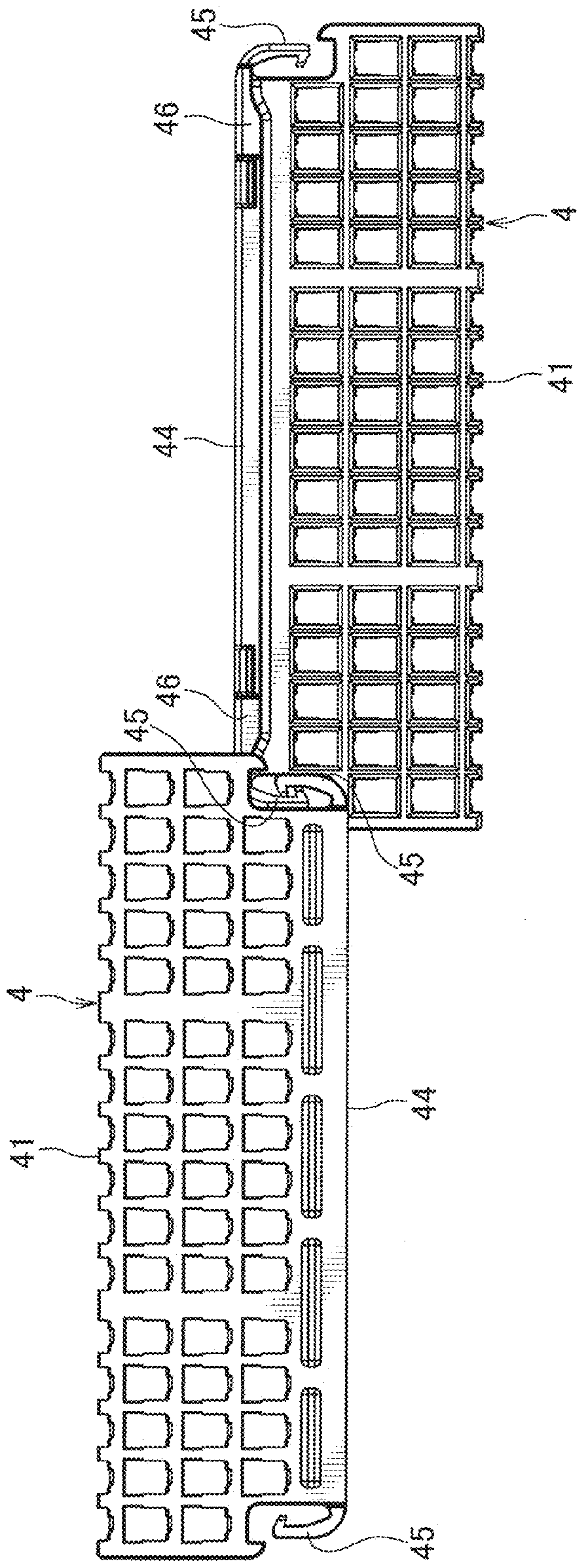
FIG. 6 is a view showing a state in which two of the spacers according to the present invention abut against each other.
Figure 7:
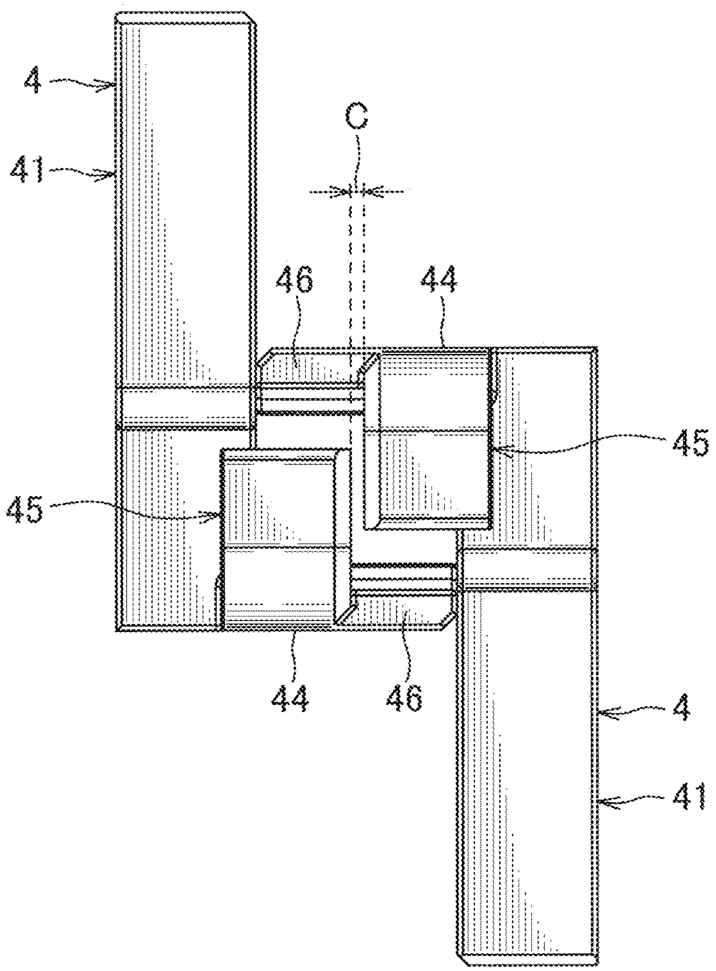
FIG. 7 is a view showing the two spacers in FIG. 6 when viewed from a lateral side.
Figure 8:
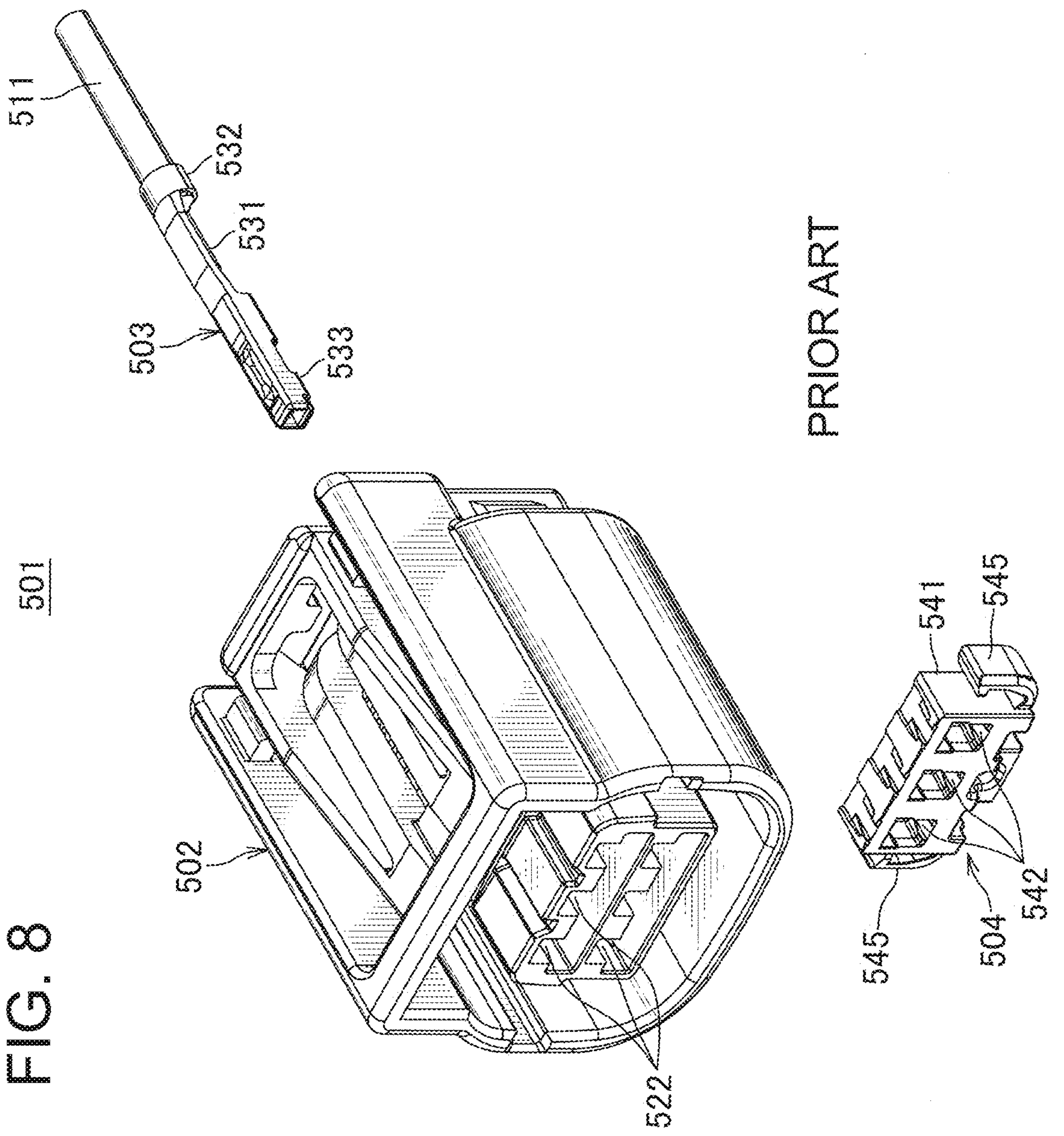
FIG. 8 is an exploded view showing a connector including a conventional spacer.
Figure 9:
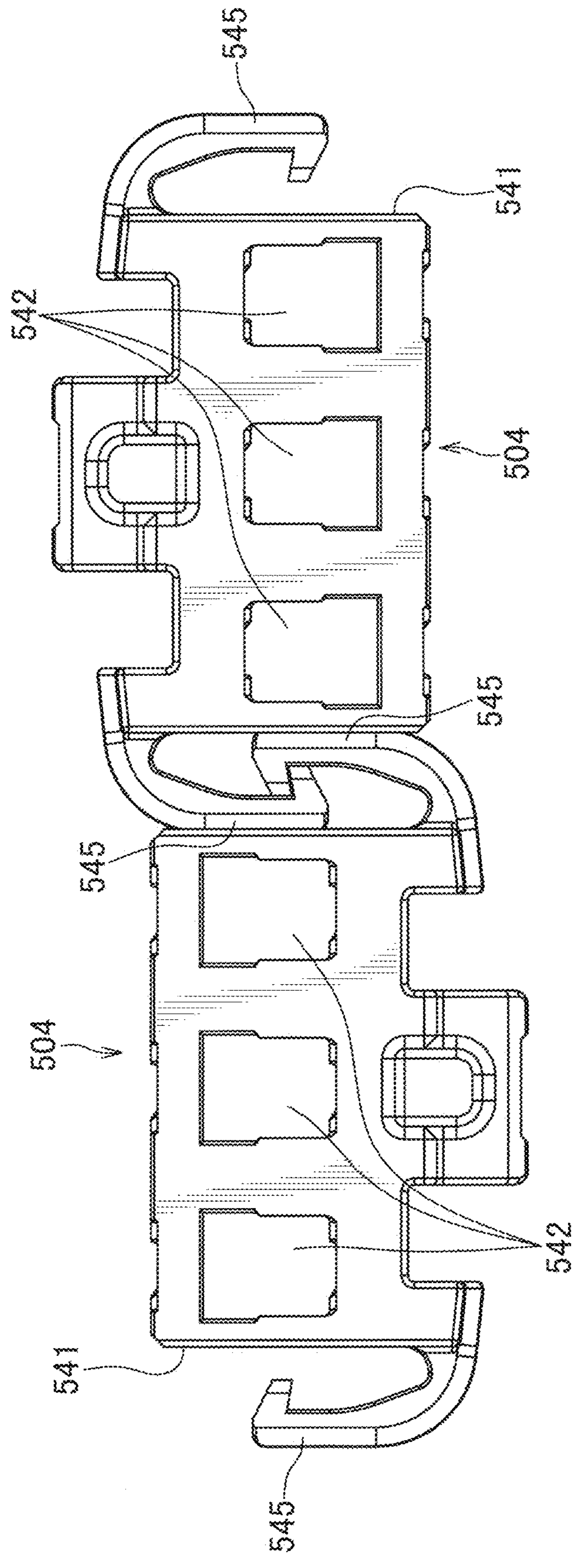
FIG. 9 is a view showing a problem of the spacer in FIG. 8.

By providing the protrusion portion 46, with regard to the spacer 4 having the above-described configuration, when the two spacers 4 come into contact with each other as shown in FIG. 6 and FIG. 7, at first the protrusion portion 46 can come into contact with the opponent and it is possible to obtain a clearance C between the retaining arms 45 of the two spacers 4. Accordingly, it is possible to prevent the retaining arms 45 from getting entangled. Also, with regard to the spacer 4, both end portions (the side surfaces 41*a*, 41*b*) of the main body portion 41 in the longitudinal direction are arranged at the outside with respect to the pair of retaining arms 45 such that when the plurality of spacers 4 come into contact with each other, it is possible to prevent the retaining arms 45 of the plurality of spacers 4 from getting entangled.

Accordingly, it is possible to prevent the damage of the retaining arms 45 and reduce the occurrence of defective products. Also, at the time of assembling the connector 1 by the machine, it is possible to avoid the retaining arms 45 of the plurality of spacers 4 in the part feeder from getting entangled with each other so as to avoid the machine from stopping and improve the production efficiency. Also, the spacer 4 is formed in the shape that is able to be assembled to the housing 2 in only one direction such that it serves as a pokayoke to prevent any reverse assembly when being assembled to the housing 2. Furthermore, the spacer 4 can use the bottom surface of the connection portion 44 and the bottom surface of the protrusion portion 46 as the contact surface of the jig when assembling the members in addition to the bottom surface 41*d* of the main body portion 41. In this manner, it is possible to secure a broad contact surface of the jig so as to secure the strength of the jig and improve the assembly precision.

It is noted that the above-described embodiment merely shows a typical aspect of the present invention, and the present invention is not limited to this embodiment. That is, various modifications can be made without departing from the spirit of the present invention. Such modifications are, of course, included within the scope of the present invention as long as they still have the structure according to the present invention.

REFERENCE SIGNS LIST

1 connector
2 housing
3 terminal
4 spacer
41 main body portion
42 terminal insertion hole
44 connection portion
45 retaining arm
46 protrusion portion

What is claimed is:

1. A spacer mounted on a housing accommodating a plurality of terminals to prevent the plurality of terminals from slipping out, the spacer comprising:

a main body portion provided with a plurality of terminal insertion holes through which the plurality of terminals pass respectively;

a retaining arm being retained to the housing;

a connection portion configured to connect the main body portion and the retaining arm; and a protrusion portion protruding from the connection portion, wherein the main body portion is arranged at one side of the retaining arm, and the protrusion portion is arranged at the other side of the retaining arm, wherein a direction in which the plurality of terminals pass through the plurality of terminal insertion holes respectively is defined as a terminal insertion direction, and the main body portion is arranged at one side of the retaining arm in the terminal insertion direction, and the protrusion portion is arranged at the other side of the retaining arm in the terminal insertion direction.

2. The spacer according to claim 1, wherein the main body portion is formed in a plate shape with a longitudinal direction and a short direction, the terminal insertion direction being orthogonal to the longitudinal direction and the short direction, a pair of the retaining arms are provided, wherein the pair of the retaining arms are arranged to be spaced with an interval therebetween in the longitudinal direction, and the pair of the retaining arms are arranged at a central side with respect to both end portions of the main body portion in the longitudinal direction.

* * * * *